Figure 1:
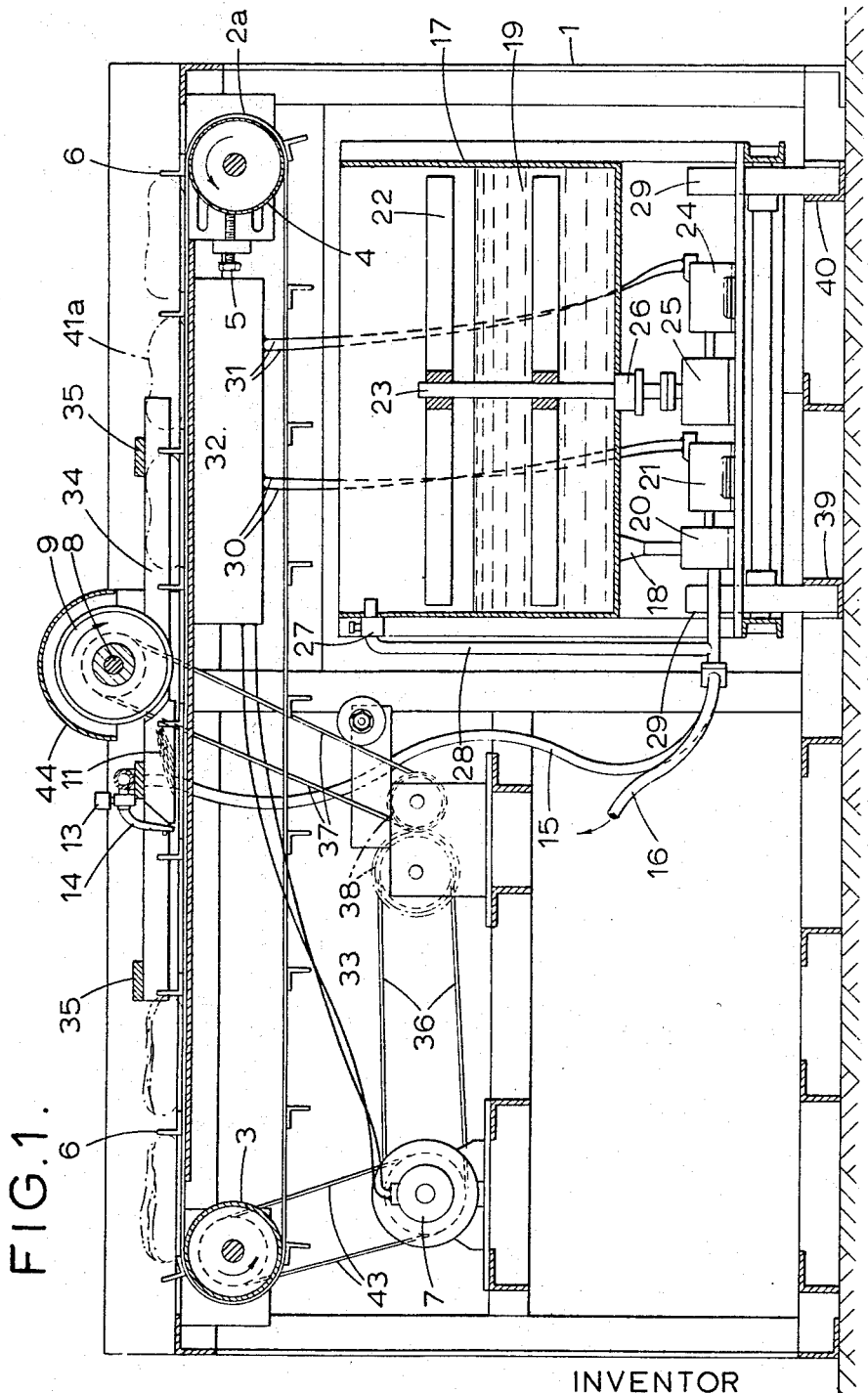

INVENTOR
RAYMOND MORRIS WILLIAM WARD
BY
Lieberman and Levy
ATTORNEYS

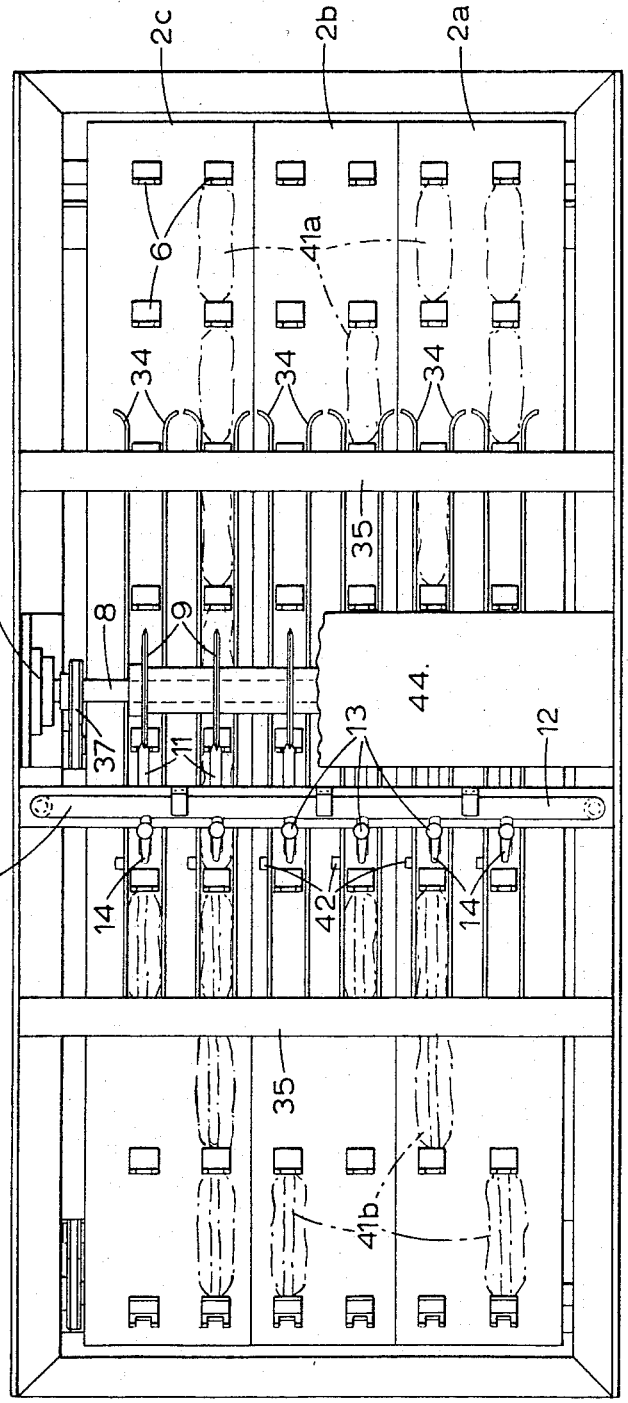

United States Patent Office 3,288,086
Patented Nov. 29, 1966

3,288,086
MACHINE FOR SLITTING AND FILLING
DOUGHNUTS AND THE LIKE
Raymond Morris William Ward, 18 Whitehouse Way,
Iver Heath, England
Filed Apr. 17, 1964, Ser. No. 360,696
2 Claims. (Cl. 107—1)

The present invention relates to a machine for slitting and filling doughnuts or the like and is more particularly concerned with providing a machine which will make a longitudinal slit in a substantially oblong doughnut and then fill the slit with a desired filling or fillings such as cream and/or jam. Although the invention is primarily concerned with slitting and filling doughnuts it may be used to slit and fill other like cakes such as buns, for example.

According to the present invention a machine for slitting and filling doughnuts or the like comprises a conveyor belt with a knife blade above it and extending along the line of travel thereof to slit a doughnut or the like as it passes thereunder on the conveyor belt, means being provided to prevent slipping of the doughnut or the like on the conveyor belt as it is being slit, a device positioned to open up the slit and hold it open to allow a fluid filling to be injected into it by a nozzle which can be fed with a fluid filling through a valve to enable the flow of fluid filling from the nozzle to be controlled, a sensing device being positioned to effect opening of the valve as the doughnut or the like reaches the nozzle, to allow the fluid filling to be injected by the nozzle into the slit, and to effect closing of the valve immediately the doughnut or the like has passed the nozzle to cut off the flow of fluid filling from the nozzle.

How the invention may be carried out will now be described by way of example only and with reference to the accompanying drawings in which:

FIGURE 1 is a side elevation showing a machine constructed according to the invention, and FIGURE 2 is a plan view of the machine shown in FIGURE 1.

The machine has a frame 1 made up of lengths of angled metal on which the various components comprising the machine are mounted.

A conveyor is mounted along the top of the frame 1 and comprises three parallel conveyor belts 2a, 2b and 2c, each of which passes round a driving roller 3 at one end of the frame 1 and an idler roller 4 at the other end of the frame 1. The horizontal position of the idler roller 4 is adjustable by means of a bolt 5 in order to enable the tension in the conveyor belts 2a, 2b and 2c to be adjusted. Each belt 2 has a plurality of equidistantly spaced stop-members 6 thereon, for a purpose described later, each stop member having a slot 6a therein, also for a purpose described later.

The driving roller 3 is driven from an electric motor 7 by way of a variable speed gear box and belt 43, in the direction shown.

A shaft 8 having six rotary knife blades 9 secured thereto is mounted in bearings 10, above the conveyor belts 2a, 2b and 2c, each blade 9 extending along the line of travel of the respective conveyor belt directly above which it is mounted. The shaft 8 is driven, via belts 36, 37 and gearing 38, from the electric motor 7. A single guard 44 is mounted over the blades 9, although, alternatively, each blade could be provided with a separate guard.

Each knife blade 9 has a wedge-shaped member 11 positioned immediately after it and extending along the line of travel of the respective conveyor belt. Each wedge-shaped member 11 is positioned so that its narrower end is nearest the respective knife blade 9.

A manifold 12 is mounted across the top of the frame 1 and has six solenoid-operated valves 13 in communication therewith, each valve 13 having a depending nozzle 14 which is adjacent the wider end of the respective wedge-shaped member 11. The manifold 12 has supply pipes 15 and 16 connected one to each end thereof, in order to minimise the variation in pressure of the liquid filling fed to different nozzles, through which a liquid filling, such as cream, can be pumped to the valves 13 and nozzles 14, from a vat 17. The vat 17 has an outlet 18 in the bottom thereof, through which the liquid filling 19 is drawn by a pump 20 which is driven by an electric motor 21. The vat 17 has a rotary agitator 22 mounted on a shaft 23 therein, the shaft 23 being driven by a further electric motor 24 through a variable speed gear box 25. The shaft 23 passes through a shaft seal 26 mounted on the bottom of the vat 17. The purpose of the agitator 22 is to prevent cavitation occurring in that zone of the liquid filling 19 that is near the outlet 18, due to the suction of the pump 20 with consequent interruption of the flow of the liquid from the vat. This is otherwise likely to occur particularly when the filling is cream, although not as likely when it is jam. In use the pump 20 is driven continuously, thus continuously supplying the valves 13 with fluid filling under pressure. A spring-loaded by-pass valve 27 is therefore provided in a conduit 28, communicating with the supply conduit 29 from the pump 20, through which the fluid filling 19 can flow back into the vat 1 when the pressure in the supply pipes 15 and 16 exceeds a certain value, which value can be varied by adjusting the compression of the valve spring. The vat 17 is mounted on four wheels 29 so that it can be easily removed from within the frame 1, after disconnection of the pipes 15 and 16 and leads 30 and 31 by which the motors 21 and 24 respectively are connected to a control panel 32, to which the motor 7 is also connected by leads 33. The wheels stand on angled-metal members 39, 40, which also serve as guides when the vat is being wheeled into the position shown. By having the vat 17 easily removable it can be quickly changed for a full vat when empty, or be replaced by a vat having a different liquid filling, if required.

Each conveyor belt 2a, 2b and 2c has two pairs 34 of spaced-apart guides extending above it and longitudinally thereof, the ends of each guide being supported by a transverse member 35 mounted on the frame 1. The guides of each pair 34 are spaced apart just enough to accommodate an oblong doughnut in order to guide it under the respective blade 9 for slitting. The guides 34 are preferably adjustable in a transverse direction so that cakes of shapes other than that of the doughnuts illustrated may be accommodated therebetween for slitting and filling.

The way in which the aforedescribed machine works will now be described.

Unslit oblong doughnuts 41a, shown in broken lines, are placed on the conveyor belts 2a, 2b and 2c at the right-hand end, as viewed in the drawings, each doughnut being placed in front of one of the upstanding stop-members 6, which are in line with the gap between the respective pairs of guides 34. As the conveyor travels to the left it conveys the doughnut between the respective pair of guides 34 and underneath the respective rotary knife blade 9 which makes a longitudinal slit in it. The stop member 6 prevents the doughnut slipping backwardly relatively to the conveyor belt when it is subjected to the cutting action of the blade 9. As the doughnut continues to travel to the left the slit therein is engaged by the narrower end of the wedge-shaped member 11 and is forced apart thereby as it passes underneath it. The slit in the doughnut is thus opened up and held open until it passes under the respective nozzle 14. A micro-switch has an actuating member 42 extending into the path of travel of the doughnut to be closed by the side of the doughnut as it passes under the nozzle 14, thus causing the respective solenoid valve 13 to be opened and the liquid filling to be pumped through the nozzle 14 into the opened-up slit. Immediately the doughnut has passed from underneath the nozzle 14 and the side of the doughnut is therefore no longer in contact with the actuating member 42 of the micro-switch, this actuating member springs back to its original position, thereby opening the micro-switch and thus de-energising and closing the respective solenoid valve 13. The volume of liquid filling injected at a time can be varied by varying the compression of the aforementioned spring of the by-pass valve 27. The filled doughnut 41b is removed from the conveyor belt at the left-hand end thereof. The stop-members 6 have slots in their upstanding portions to accommodate the respective blade 9 and nozzle 14 as they pass thereunder. The stop-members 6, wedge members 11 and guides 34 are conveniently shaped from perspex sheet.

It should be appreciated that the aforedescribed and illustrated machine is by way of example only and that modifications may be made thereto without departing from the scope of the invention.

For example, the stop-members 6 may be of modified shape and the position of nozzles 14 adjustable to enable the liquid filling to be injected at different heights and/or angles to suit the cakes being filled. Any other suitable means may be provided, in place of the stop-members 6, to prevent the doughnuts or the like slipping longitudinally relatively to the conveyor belt when they are being cut.

The sensing device could also take different forms, such as a photo-electric cell positioned to detect when a doughnut or the like comes under the nozzle 14 and connected to then energise the solenoid operated switch 13 to open it and then close it immediately the doughnut or the like passes from underneath the nozzle 14.

Although the machine is shown as having three conveyor belts 2a, 2b and 2c in parallel these could on the one hand be replaced by a single conveyor belt or on the other hand by more than three conveyor belts. It will be appreciated that the machine could be constructed to be capable of dealing with any number of rows of doughnuts or the like in parallel and is not limited to a machine (as illustrated) having six rows in parallel.

The machine described and illustrated is constructed to inject only one filling, such as cream, into the doughnut or the like after slitting but it could be constructed to have a second set of nozzles 14, valves 13, micro-switches 42 positioned after and in series with those illustrated, to inject a second filling such as jam into the slit and on top of the cream already in the slit of the doughnut or the like, the jam being pumped from a second vat in a similar manner to that already described and illustrated in connection with the vat 17.

It is possible that it may be desired to provide the doughnut or the like with three fillings, one on top of the other, such as cream-jam-cream, in which case a third set of nozzles 14, valves 13, micro-switches 42 and a third vat 17 would be provided.

What is claimed is:

1. A machine for slitting and filling articles such as doughnuts comprising a conveyor belt adapted to advance said articles; a rotatable knife blade arranged to rotate above said belt about an axis transverse to the direction of travel thereof; a plurality of stops on said belt to prevent said articles from sliding as they are slit by said knife blade; a wedge-shaped member positioned after said knife blade, said member being positioned so that the smaller end thereof will engage in said slits in said articles after they have passed said knife blade whereby said slits will be opened; a vat for filling material; a filling nozzle positioned adjacent the larger end of said wedge-shaped member; a valve controlling the supply of filling material from said vat to said nozzle; an actuating member arranged to be engaged by said articles to open said valve to supply filling material to said nozzle for injection into said slits and to be disengaged from said articles as the advance thereof on said belt is continued thereby to close said valve and cut off the supply of said filling material; a conduit by which said vat is connected with said nozzle; a releasable connection between said conduit and said vat; and wheels on which said vat is supported so as to be easily removable.

2. A machine for filling doughnuts comprising a plurality of conveyor bands each of which is arranged to advance a plurality of doughnuts; guides extending longitudinally of said belts to guide said doughnuts in the correct path; a knife blade arranged above each of said belts so as to slit doughnuts longitudinally as they are advanced; projections on said belts against which said doughnuts can be placed whereby said doughnuts are prevented from slipping on said belts as they are being slit by said knives; a wedge-shaped member arranged above each said belt so that its narrower end will enter the slit in each doughnut after it has been cut thereby to open said doughnuts; a filling nozzle arranged adjacent the wider end of each said wedge-shaped member to inject filling material into said slits; a vat for said filling material; a valve associated with each nozzle for controlling the issue of filling material from said nozzle into said slits; and means responsive to the position of each doughnut on said belts to open and close said valves.

References Cited by the Examiner

UNITED STATES PATENTS

| | | | |
|---|---|---|---|
| 2,594,344 | 5/1952 | Egerton et al. | 107—1 |
| 2,747,521 | 5/1956 | Gardner | 107—1 |

WALTER A. SCHEEL, *Primary Examiner.*

J. SHEA, *Assistant Examiner.*